United States Patent Office 2,983,248
Patented May 9, 1961

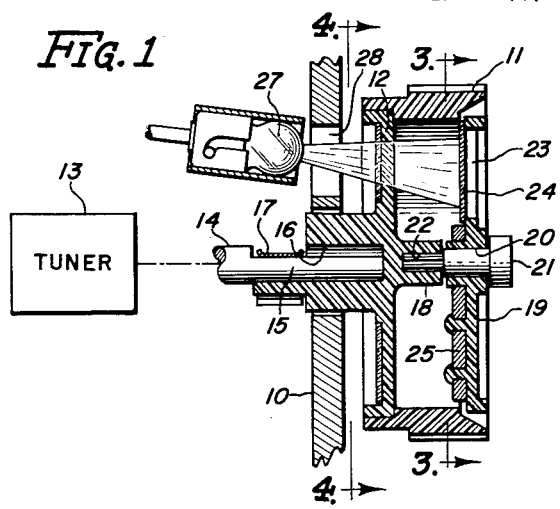
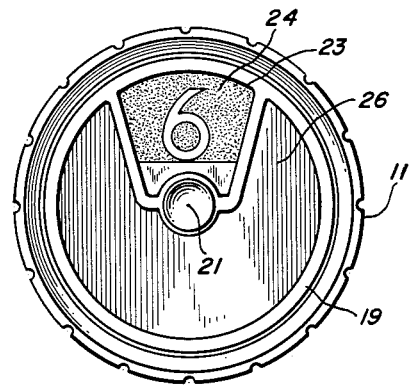
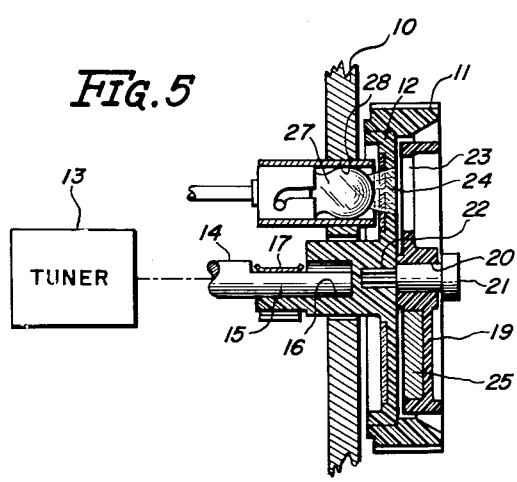
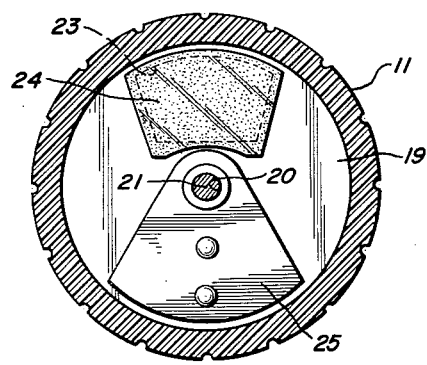
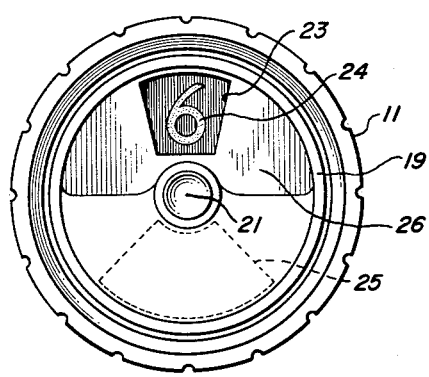
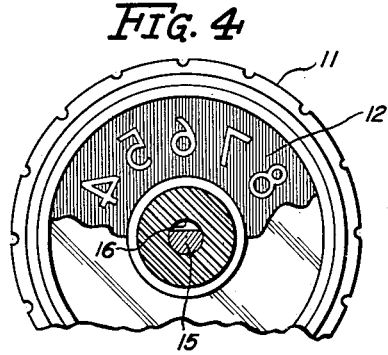

2,983,248
FREQUENCY-CHANNEL INDICATOR
Carl J. Steinke, Des Plaines, Ill., assignor to Zenith Radio Corporation, a corporation of Delaware
Filed Feb. 27, 1959, Ser. No. 796,051
4 Claims. (Cl. 116—124.4)

This invention pertains to a frequency-channel indicator for a wave-signal receiver and is particularly useful in a television receiver.

Frequency-channel indicators for television receivers of the type which project an illuminated indication of a selected channel onto a viewing screen constituting the front end of a rotatable adjustment knob have been successfully employed in the past and are disclosed and claimed, for example, in U.S. Patent No. 2,681,634 for "Channel Indicator For Televisions" issued on June 22, 1954, to E. J. Polley and assigned to the present assignee. Such indicators project the channel number onto essentially the entire front area of the channel selector knob. It is sometimes desirable, however, to utilize only a portion of the knob as a viewing section and to mask the remaining portion but this is not feasible with indicators in which the viewing section rotates with adjustment of the knob into which it is constructed.

Accordingly, it is an object of this invention to provide an illuminated frequency-channel indicator in conjunction with a rotatable adjustment knob having a viewing screen section which remains in a fixed position independently of the angular adjustment of the knob.

A wave-signal receiver to which the invention is especially suited is of the type having a shaft rotatable for selectively tuning the receiver to any of a plurality of frequency channels and a rotatable adjustment knob coupled to the shaft for varying an operating characteristic of the receiver. The knob includes a hollow, substantially cylindrical body section and accommodates a frequency-channel indicator constructed in accordance with this invention. The indicator comprises an index wheel coupled to the shaft and constituting a rear wall of the knob body section; it has indicia arranged in a predetermined pattern about the shaft individually shaped to designate a particular one of the frequency channels and the index wheel is mounted for movement to present the indicia sequentially at a reference position. The index wheel moves concurrently with the knob and shaft in order to change the one of the indicia in the reference position with changes in tuning. The indicator further includes masking means rotatable on the shaft for revealing the one of the indicia instantaneously located in the reference position. This means comprises a disc constituting a closure disposed across the front end of the knob, having a viewing section disposed in an optical path extending from the reference position and supported for free rotational movement relative to the knob. It further comprises positioning means retaining the viewing section in that optical path independently of the angular adjustment of the knob. A light source is positioned within the receiver to project an image of the one of the indicia in the reference position along the optical path to the viewing section.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1 is a cross-sectional view, partially schematic, of one embodiment of the invention;

Figure 2 is a front elevation of Figure 1;

Figure 3 is a sectional view of the channel indicator of Figure 1 taken along lines 3—3 thereof;

Figure 4 is a sectional view of the channel indicator of Figure 1 taken along lines 4—4 thereof;

Figure 5 is a cross-sectional view, partially schematic, of another embodiment of the invention; and Figure 6 is a front elevation of the apparatus shown in Figure 5.

The frequency-channel indicator illustrated in Figures 1-4 is mounted on the cabinet of a wave-signal receiver only a small portion 10 of which is shown. The indicator is incorporated with a rotatable adjustment knob having a hollow, substantially cylindrical body section 11. For convenience of illustration the adjustment knob is shown as a tuning knob, but other adjustment knobs could serve equally well. An index wheel 12, Figures 1 and 4, is positioned towards the rear end of the body section of the adjustment knob. The index wheel has indicia shaped to designate particular frequency channels and located about the central axis of the wheel as best seen in Figure 4. The index wheel is mechanically coupled to a tuning device, schematically shown as tuner 13, by a shaft 14 having a semi-flattened end portion 15 insertable into an aperture 16 in index wheel 12 and retained by a spring clip 17. The index wheel 12 also has a central hub 18 which protrudes into the body section 11 of the adjustment knob. A disc 19 having a central aperture 20 is positioned towards the front end of the knob and is supported for free rotational movement relative to the knob by a bearing pin 21 insertable through the aperture 20 in the disc 19 into secured mechanical engagement with an aperture 22 in the hub of the index wheel. As seen in Figures 1, 2 and 3, the disc 19 has a viewing section 23 constituting a projection screen of translucent material 24 such as paper or stippled plastic and a weighted section 25 diametrically opposed to the viewing section. The weighted section 25 is illustrated as a separate weight, but it could also be integrally formed with the disc 19. Additionally disc 19 has an opaque masking section 26 which serves to define the viewing section. A light source 27 is shown positioned inside the cabinet 10 behind an aperture 28 in the cabinet wall in optical alignment with a portion of the index wheel and the viewing section.

The operation of the frequency-channel indicator illustrated in Figures 1-4 is as follows. The clearance between the bearing pin 21 and the central apertures 20 in the disc is sufficient for supporting the disc for free rotational movement relative to the knob such that the weighted section 25 tends to pendulously retain the viewing section 23 in the upright position independently of the angular adjustment of the knob. The adjustment of tuner 13 also causes rotation of the index wheel 12 which places one of the channel indicia in a reference position which is in an optical path extending to the viewing section 23. Light from source 27 projects an image of the one of the indicia in the reference position onto the projection screen 23 giving a clear illuminated indication of the frequency channel to which the receiver is tuned.

In the embodiment illustrated in Figures 5 and 6 the disc 19 is positioned in close proximity to the index wheel 12 and the viewing section 23 of the disc is either open or transparent. Thus the light source 27 forms a direct indication through the viewing section 23 of the indicia in the reference position. In this way less projection is accomplished but a shallower knob is possible. As in the previous embodiment the disc 19 has a masking section 26, a viewing section 23 and a weighted section 25 to position and retain the viewing section in the upright position independently of the angular adjustment of the knob.

In summary, the channel indicator comprises the index wheel 12 mounted toward the rear of a cylindrical adjustment knob and arranged for step by step displacement as the tuner of the receiver is tuned from one channel to the next. This movement of the index wheel causes channel numbers to appear sequentially in the projection path. The arrangement has means for revealing the particular channel number instantaneously located in the reference position and this means is provided by the disc 19 positioned near the front of the knob and having a viewing section 23 which is a small sector of the disc. The disc is disposed so that this viewing section is in an optical path to receive a projection of the channel number. Moreover, the arrangement has means for retaining the viewing section in the projection path, independent of adjustment of the knob into which the channel indicator is constructed. This means, for the arrangement shown, is a weighted section 25 of the disc 19 in conjunction with the bearing pin 21 and hub 18 of the index wheel which collectively serve to position and retain the viewing section in its desired location in the projection path. An image is projected along that path through the influence of the light source.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a wave-signal receiver having a shaft rotatable to selectively tune said receiver to any of a plurality of frequency channels and a rotatable adjustment knob coupled to said shaft to vary an operating characteristic of said receiver, said knob including a hollow, substantially cylindrical body, a frequency-channel indicator comprising: an index wheel coupled to said shaft and constituting a rear wall of said body, said index wheel including a plurality of indicia arranged in a predetermined pattern about said shaft with each of said portions being individually shaped to designate a particular one of said frequency channels and with said index wheel mounted to move and present said portions sequentially at a reference position, said index wheel concurrently moving with said knob and shaft to change the one of said indicia in said reference position with changes in tuning; masking means rotatable on said shaft to reveal the one of said indicia instantaneously located in said reference position comprising a disc constituting a closure disposed across the front of said body, a portion of said disc forming a viewing section disposed in an optical path extending from said reference position, and said disc supported to move freely rotationally relative to said knob and further including positioning means retaining said viewing section in said optical path independently of the angular adjustment of said knob; and a light source positioned within said receiver to project an image of the one of said indicia in said reference position along said optical path to said viewing section.

2. An indicator as defined in claim 1 in which a translucent member is disposed across said viewing section to constitute a screen upon which said light source projects said image.

3. An indicator as defined in claim 1 in which said positioning means comprises a weight disposed on a portion of said disc diametrically opposite said viewing section.

4. An indicator as defined in claim 3 in which said index wheel includes a hub located centrally thereof and coupled to said shaft, said disc has an aperture in the center thereof, and which includes a bearing pin projecting through said aperture and into mechanical engagement with said hub.

References Cited in the file of this patent

UNITED STATES PATENTS

| | | |
|---|---|---|
| 1,629,680 | Cooke | May 24, 1947 |
| 2,575,856 | Ware | Nov. 20, 1951 |
| 2,681,634 | Polley | June 22, 1954 |
| 2,819,698 | Kirsten | Jan. 14, 1958 |
| 2,907,298 | Steinke | Oct. 6, 1959 |